United States Patent Office 3,457,250
Patented July 22, 1969

3,457,250
PROCESS AND CATALYST FOR PRODUCTION OF HIGH-VINYL POLYBUTADIENE
Rudolf H. Gaeth, Lake Jackson, Tex., assignor to Phillips Petroleum Company, a corporation of Delaware
No Drawing. Filed Jan. 31, 1968, Ser. No. 701,836
Int. Cl. C08d 1/14, 3/06, 3/08
U.S. Cl. 260—94.3
6 Claims

ABSTRACT OF THE DISCLOSURE

Polybutadiene containing a high percentage of vinyl configuration is prepared by the polymerization of butadiene in the presence of a catalyst formed from (1) a vanadium salt of an organic acid or a vanadium salt of a beta-diketone, (2) a trihydrocarbylaluminum compound, and (3) molybdenum pentachloride.

BACKGROUND OF THE INVENTION

In recent years there has been a great deal of activity in the development of processes for producing olefin polymers. Polymers of monoolefins, such as ethylene and propylene, prepared by these processes have received wide acceptance by many industries. The more discovery in the field of diene polymerization of certain so-called stereospecific catalysts, which make possible the formation of polymers having a desired configuration, has aroused considerable interest. The polymers formed by the use of these catalysts often have outstanding physical properties which render them equal to or even superior to natural rubber. The present invention is concerned with a novel and improved process for preparing a polybutadiene containing a high percentage of 1,2-addition.

THE INVENTION

In accordance with the present invention, I have discovered that high-vinyl polymers are obtained by polymerization of butadiene using a catalyst formed from a vanadium salt of an organic acid or a vanadium salt of a betadiketone, a trihydrocarbylaluminum compound and molybdenum pentachloride wherein only minor effects on microstructure and molecular weight result from a change in mole ratios of catalyst components.

It is an object of this invention to provide a novel process for producing a rubbery polymer of 1,3-butadiene.

Another object of the invention is to provide a process for polymerizing 1,3-butadiene in which the rubbery polymer product produced contains a high percentage of 1,2-addition.

A further object of the invention is to provide a new and improved catalyst system containing molybednum pentachloride, which is effective in polymerizing 1,3-butadiene to a polybutadiene containing a high percentage of 1,2-addition.

Other and further objects and advantages of the invention will become apparent to those skilled in the art upon consideration of the accompanying disclosure.

In U.S. Patent No. 3,232,920, there is disclosed a process for preparing rubbery polymers of butadiene with catalysts containing molybednum pentachloride. Used in conjunction with the molybdenum pentachloride in the catalyst system is a complex metla hydride or an organo compound of gallium, lead, zinc, mercury or indium. Although organoaluminum compounds have been extensively used in many catalyst systems, these compounds were found to be unsatisfactory for use in the catalyst system with molybdenum pentachloride. Thus, when employing a catalyst consisting of molybdenum pentachloride and a trialkylaluminum in polymerizing butadiene, only very low yields of a resinous, insoluble polymer is obtained.

According to the present invention, it has now been discovered that butadiene can be polymerized in the presence of a catalyst system comprising an organoaluminum compound and molybdenum pentachloride so as to obtain a high vinyl, rubbery polymer if the polymerization is conducted in the presence of a vanadium salt of an organic acid or a vanadium salt of a beta-diketone. When operating in this manner, at least 80 percent, e.g., in the range of 85 to 95 percent and higher, of the polymer product is formed by 1,2-addition of the butadiene.

The catalyst used in the practice of the present invention comprises molybdenum pentachloride, a vanadium salt of an organic acid or a vanadium salt of a beta-diketone, and an organoaluminum compound having the formula $R_3Al$ wherein R is an alkyl, alkaryl, aryl, aralkyl or cycloalkyl radical. The hydrocarbon radical preferably contains from 1 to 20, inclusive, carbon atoms. Examples of compounds corresponding to the formula $R_3Al$ include trimethylaluminum, triethylaluminum, triisobutylaluminum, tri-n-decylaluminum, tri-seceicosyaluminum, tribenzylaluminum, triphenylaluminum, trinaphthylaluminum, tri-p-tolylaluminum, tricyclohexylaluminum, tri(4-methylcyclohexyl)aluminum, tri(4-butylcyclohexyl)aluminum, tri(4-cyclohexylbutyl)aluminum, and the like.

Vanadium compounds employed in the catalyst systems of this invention include both vanadium and vanadyl salts of organic acids having 2 to 20 carbon atoms therein, i.e., aliphatic, cycloaliphatic, and aromatic acids, such as acetic acid, propionic acid, pentanoic acid, 2-methylbutanoic acid, 3-ethylhexanoic acid, caprylic acid, capric acid, lauric acid, myristic acid, palmitic acid, arachidic acid, naphthenic acids such as cyclobutanecarboxylic acid and cyclohexanecarboxylic acid, benzoic acid, and 2-naphthoic acid, and vanadium and vanadyl salts of beta-diketones. Beta-diketones from which the vanadium salts are prepared can be represented by the formula:

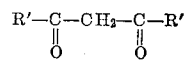

wherein R' is a saturated aliphatic, saturated cycloaliphatic, or an aromatic radical or combinations thereof containing from 1 to 10 carbon atoms. Examples of beta-diketones include 2,4-pentanedione (acetylacetone), 3,5-heptanedione, and 1,5-dicyclopentyl-2,4-pentanedione.

The mole ratio of organoaluminum to vanadium compound is in the range of 1:1 to 6:1, preferably 1:1 to 3:1. In order to obtain active catalyst, the mole ratio of organoaluminum to vanadium compound must be at least 1:1. The mole ratio of molybdenum pentachloride to organoaluminum compound is in the range of 0.2:1 to 5:1, preferably 0.5:1 to 5:1. The catalyst level is based on the vanadium component and is generally in the range of 0.25 to 10 gram millimoles, preferably 1 to 4 gram millimoles, per 100 grams of monomer.

It is usually preferred to carry out the polymerization in the presence of a diluent. Diluents suitable for use in the polymerization process are hydrocarbons which are not detrimental to the polymerization reaction and which are liquid under the conditions of the process. It is generally preferred to utilize as diluents aromatic hydrocarbons, such as toluene, benzene, ethylbenzene, xylene, and the like. Cycloaliphatic hydrocarbons, such as cyclohexane, cyclopentane, methylcyclohexane, and the like, can also be used although they are less desirable than the aromatic hydrocarbons.

The polymerization process of this invention can be carried out at temperatures varying over a rather broad range. It is usually preferred to operate at a temperature between zero and about 250° F., and more desirably at a temperature in the range of 50° to 200° F. The polymerization can be carried out under autogenous pressure or any pressure suitable for maintaining the reaction mixture substantially in the liquid phase. The pressure will thus depend upon the particular diluent being employed and the temperature at which the polymerization is conducted. However, higher pressures can be employed, if desired, these pressures being obtained by some such suitable method as the pressurization of the reactor with a gas which is inert with respect to the polymerization reaction.

The process of this invention can be carried out in a conventional batch operation or in a continuous operation. The process can also be carried out continuously by maintaining the above-mentioned concentrations of reactants in the reactor for a suitable residence time. The residence time in a continuous process will, of course, vary within rather wide limits depending upon such variables as temperature, pressure, the ratio of catalyst components, and the catalyst concentration. In a continuous process, the residence time will usually fall within the range of 1 second to 5 hours when conditions within the specified ranges are employed. When a batch process is being utilized, the time for the reaction can be as high as 24 hours or more.

Various materials are known to be detrimental to the catalyst compositions of this invention. These materials include carbon dioxide, oxygen and water. It is desirable, therefore, that the 1,3-butadiene be freed of these materials as well as other materials which may tend to inactivate the catalyst. Any of the known means for removing such contaminants can be used. Furthermore, when a diluent is used in the process, it is preferred that this material be substantially free of impurities such as water, oxygen and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated in the reaction mixture is insufficient to cause complete deactivation of the catalyst.

Upon completion of the polymerization reaction, when a batch process is used, the reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to recovery of the polymer. After addition of the catalyst-inactivating agent and the antioxidant, the polymer present in the solution can then be separated by the addition of an excess of a material such as ethyl alcohol or isopropyl alcohol. When the process is carried out continuously, the total effluent from the reactor can be pumped from the reactor to a catalyst-inactivating zone where the reactor effluent is contacted with a suitable catalyst-inactivating material, such as an alcohol. When an alcohol is used as the catalyst-inactivating material, it also functions to precipitate the polymer. In the event catalyst-inactivating materials are employed which do not perform this dual role, a suitable material, such as an alcohol, can then be added to precipitate the polymer. It is, of course, to be realized that it is within the scope of the invention to employ other suitable means to recover the polymer from solution. After separation from the water or alcohol and diluent by filtration or other suitable means, the polymer is then dried.

The polybutadiene produced in accordance with the process of this invention is a rubbery polymer having at least 80 percent 1,2-addition. The term "rubbery polymer" as used herein includes elastomeric, vulcanizable polymeric material which after vulcanization, i.e., cross-linking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent. With regard to the solubility of the rubbery polymer of this invention, it has been possible by the present process to obtain polymers which contain substantially no gel as determined by the standard gel determination test. The below-described procedure is followed in carrying out this test. If the gel content is expected to be below 50 percent, the sample of polymer to be tested for gel should weight from 0.10 to 0.13 gram while if the gel content is expected to be above 50 percent, a sample weighing from 0.13 to 0.18 is used. The sample is placed in a cage of calibrated weight, fabricated from 80-mesh 18-8 stainless steel screen. The cage containing the polymer is then placed in a 4-ounce wide-mouthed bottle into which 100 milliliters of reagent grade toluene is pipetted. The bottle is then capped tightly with a threaded cap, fitted with a cardboard gasket and protected with a circle of aluminum foil. The bottle is then placed in the dark and allowed to stand at room temperature for at least 24 hours and preferably not more than 48 hours. No shaking or stirring of the contents is permissible during this dissolution. At the end of this period, the cage is withdrawn from the bottle and placed in a wide-mouthed 2-ounce bottle. The weight of the gel which is adhering to the cage is calculated and expressed as swelled gel. The cage containing the gel is then dried in a vacuum oven maintained at a temperature between 70 and 80° C., after which the weight of dried gel is determined. The gel is then calculated as the weight percent of the rubbery polymer which is insoluble in toluene. The swelling index is determined as the weight ratio of swelled gel to dried gel.

The rubbery polymers of this invention can be compounded and vulcanized in a manner similar to that used in the part for compounding natural and synthetic rubber. Vulcanization accelerators, vulcanizing agents, reinforcing agents, plasticizing agents, extenders and fillers such as have been used in natural rubber can likewise be used when compounding the rubbers of this invention. The rubbery polymers produced in accordance with the invention have utility and applications where natural and synthetic rubbers are used. They can be used in the manufacture of automobile tires and other rubber articles, such as gaskets, tubing, covering for wiring cable, rubber heels, rubber tile, and the like.

On account of their adhesive characteristics, polymers with a high vinyl content can be used in coating compositions, adhesive compositions, and in the manufacture of pressure sensitive tape. The polymers can be compounded and vulcanized using reinforcing agents, vulcanizing agents, vulcanization accelerators, accelerator activators, and other compounding ingredients well known in the rubber art.

A more comprehensive understanding of the invention can be obtained by referring to the following illustrative examples, which are not intended, however, to be unduly limitative of the invention.

Example I

Butadiene was polymerized in a series of runs using vanadyl naphthenate, triethylaluminum, and molybdenum pentachloride as the catalyst. The effect of varying the amount of molybdenum pentachloride was determined. The polymerization recipe was as follows:

| | |
|---|---|
| 1,3-butadiene, parts by weight | 100 |
| Cyclohexane, parts by weight | 700 |
| Vanadyl naphthenate, mhm. | 1.0 |
| Triethylaluminum, mhm. | 2.0 |
| Molybdenum pentachloride, mhm. | Variable |
| Temperature, °F. | 158 |
| Time, hours | 16 |

Mhm.=gram millimoles per 100 grams monomer

When conducting a polymerization, cyclohexane was charged first after which the reactor was purged with nitrogen. Butadiene was introduced followed by the vanadyl naphthenate, then the triethylaluminum, and finally the molybdenum pentachloride. At the conclusion of each polymerization, the reaction was shortstopped with a 10 weight percent solution of 2,2'-methylene-bis(4-methyl-6-tert-butylphenol) in a mixture of equal parts by volume of isopropyl alcohol and toluene. The amount employed was sufficient to provide approximately one part by weight of antioxidant per 100 parts by weight of polymer. The polymers were coagulated in isopropyl alcohol, separated, and dried in a vacuum oven. All products were free from gel. Results were as follows:

| Run No. | $MoCl_5$, mhm. | Conversion, Percent | Inherent viscosity | Vinyl,[1] Percent |
|---|---|---|---|---|
| 1 | 1.0 | 9.6 | 5.37 | 87.7 |
| 2 | 4.0 | 19.0 | 5.08 | 89.3 |
| 3 | 6.0 | 38.0 | 4.53 | 86.7 |
| 4 | 8.0 | 39.0 | 4.40 | 92.4 |

[1] Remainder was cis and trans as determined according to the procedure given in U.S. 3,278,508, columns 20 and 21.

These data shows that all products were predominantly vinyl, all had a high inherent viscosity, and there was no drastic change in vinyl content with a change in the molybdenum pentachloride level. The Mooney value (ML-4 at 212° F.)[1] was determined on the product from run 3 and found to be 77.

Example II

Runs were made for the polymerization of butadiene using vanadyl naphthenate, triethylaluminum, and molybdenum pentachloride as the catalyst. The effect of varying the amount of vanadyl naphthenate was determined. The polymerization recipe was as follows:

| | |
|---|---|
| 1,3-butadiene, parts by weight | 100 |
| Cyclohexane, parts by weight | 700 |
| Vanadyl naphthenate, mhm. | Variable |
| Triethylaluminum, mhm. | 2.0 |
| Molybdenum pentachloride, mhm. | 5.0 |
| Temperature, °F. | 156 |
| Time, hours | 16 |

The procedure was the same as in Example I. The polymers were gel free. Results were as follows:

| Run No. | V. naphthenate, mhm. | Conv., Percent | Inherent Viscosity | Cis | Trans | Vinyl |
|---|---|---|---|---|---|---|
| 1 | 1.0 | 24.5 | 5.82 | 6.4 | 10.6 | 83.0 |
| 2 | 1.5 | 47.0 | 6.10 | 4.8 | 10.2 | 85.0 |

These data show that an increase in conversion was obtained when the vanadyl naphthenate was increased. Both polymers had a high vinyl content.

A run was made using 1 mhm. of vanadyl naphthenate and 2 mhm. of triethylaluminum (no molybdenum pentachloride). No polymerization occurred, thus indicating that molybdenum pentachloride is an essential component in the catalyst system.

Another run was made in which 2 mhm. of ethylaluminum sesquichloride was substituted for triethylaluminum in the above recipe. No polymers were obtained.

Example III

The following recipe was employed for preparing a polymer according to the invention:

| | |
|---|---|
| 1,3-butadiene, parts by weight | 100 |
| Cyclohexane, parts by weight | 700 |
| Vanadyl naphthenate, mhm. | 1.0 |
| Triethylaluminum, mhm. | 2.0 |
| Molybdenum pentachloride, mhm. | 3.0 |
| Temperature, °F. | 158 |
| Time, hours | 20 |
| Conversion, percent | 31.4 |
| Inherent viscosity | 5.12 |
| Gel, percent | 0 |
| Mooney (ML-4 at 212° F.) | 88 |
| Microstructure, percent: | |
|   Cis | 8.4 |
|   Trans | 10.1 |
|   Vinyl | 81.5 |

The polymer was evaluated in a tread stock recipe and an 86 Mooney cis-polybutadiene (95.1 percent cis, 1.7 percent trans, and 3.2 percent vinyl) was also evaluated as a control. The compounded stocks were cured 30 minutes at 307° F. and physical properties determined. Compounding recipes and results were as follows:

| Polymer | Invention | Control |
|---|---|---|
| Compounding recipes, parts by weight: | | |
|   Polybutadiene | 100 | 100 |
|   High abrasion furnace black | 50 | 50 |
|   Zinc oxide | 3 | 3 |
|   Stearic acid | 2 | 2 |
|   Flexamine [1] | 1 | 1 |
|   Aromatic oil | 10 | 10 |
|   Sulfur | 1.75 | 1.75 |
|   NOBS special [2] | 0.8 | 0.9 |
| Cured 30 minutes at 307° F.: | | |
|   Compression set, percent (a) | 11.2 | 11.9 |
|   300 percent modulus, p.s.i. (b) | 1,330 | 1,130 |
|   Tensile, p.s.i. (b) | 2,810 | 3,200 |
|   Elongation, percent (b) | 475 | 560 |
|   ΔT, °F. (c) | 45.0 | 44.0 |
|   Resilience at 78° F., percent (d) | 67.8 | 77.8 |
|   Resilience at 120° F., percent (d) | 73.6 | 79.6 |
|   Shore A hardness (e) | 56.0 | 61.0 |
|   Blowout time, min. (f) | 70.0 | 11.8 |
|   Friction index on wet surface [3] | 139 | 98 |

[1] Physical mixture containing 65 percent of a complex diarylamine-ketone reaction product and 35 percent of N,N'-diphenyl-p-phenylenediamine.

[2] N-oxydiethylene-2-benzothiazolesulfenamide.

[3] The spherical end surface (1.5 inch randium) of a one inch cylinder is dragged across a water-wet 400 angstrom silicon carbide paper under a weight of 10 pounds. Relative values are obtained for the force required to drag the samples at the same rate. The values are related to that obtained on a 45 Mooney cispolybutadiene sample arbitrarily set at 100.

(a) ASTM D-1646-61; (b) ASTM D-1646-62T; (c) ASTM D-1646-62; (d) ASTM D-1646-59; (e) ASTM D-1706-61; (f) ASTM D-1646-59T.

A high-vinyl polymer banded tightly on the mill at all temperatures from cold to 158° F. and had good processing characteristics for an 88 Mooney polymer. The blowout time was exceptionally good. It also had good friction characteristics. The stress-strain and heat build-up were comparable to the cis-polybutadiene control.

Reasonable variations and modifications of this invention can be made, or followed, in view of the foregoing disclosure, without departing from the spirit or scope thereof.

I claim:

1. A process for preparing a rubbery polybutadiene containing at least 80 percent of 1,2-addition which comprises contacting 1,3-butadiene under polymerization conditions with a catalyst comprising (1) molybdenum pentachloride, (2) a compound having the formula $R_3Al$, wherein R is selected from the group consisting of alkyl, aryl, alkaryl, aralkyl and cycloalkyl radicals having 1–20 carbon atoms and (3) a vanadium salt of an or-

[1] ASTM D 1646-63.

ganic acid or a vanadium salt of a beta-diketone of the formula

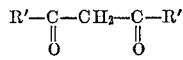

where R′ is a saturated aliphatic, saturated cycloaliphatic or aromatic radical containing 1 to 10 carbon atoms.

2. A process according to claim 1 wherein said $R_3Al$ compound is triethylaluminum and said vanadium compound is vanadyl naphthenate.

3. A process according to claim 1 wherein the temperature is in the range of 0° F. to 250° F.

4. A process according to claim 1 wherein the mole ratio of the vanadium compound to the $R_3Al$ compound is in the range of 1:1 to 1:6 and the mole ratio of molybdenum pentachloride to $R_3Al$ compound is in the range of 0.2:1 to 5:1.

5. A catalyst system comprising (1) molybdenum pentachloride, (2) a compound having the formula $R_3Al$, wherein R is selected from the group consisting of alkyl, aryl, alkaryl and cycloalkyl radicals having 1–20 carbon atoms and (3) a vanadium salt of an organic acid or a vanadium salt of beta-diketone of the formula

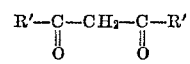

where R′ is a saturated aliphatic, saturated cycloaliphatic or aromatic radical containing 1 to 10 carbon atoms.

6. A catalyst composition according to claim 5 for the formation of high vinyl polybutadiene which comprises molybdenum pentachloride, triethylaluminum and vanadyl naphthenate.

References Cited

UNITED STATES PATENTS

| 3,116,273 | 12/1963 | Naylor et al. | 260—94.3 |
| 3,232,920 | 2/1966 | Naylor | 260—94.3 |
| 3,336,280 | 8/1967 | Naylor | 260—94.3 |

JOSEPH L. SCHOFER, Primary Examiner

R. A. GAITHER, Assistant Examiner

U.S. Cl. X.R.

252—429

UNITED STATES PATENT OFFICE
CERTIFICATE OF CORRECTION

Patent No. 3,457,250                          July 22, 1969

Rudolf H. Gaeth

It is certified that error appears in the above identified patent and that said Letters Patent are hereby corrected as shown below:

Column 7, last line, after "alkaryl" insert -- , aralkyl --.

Signed and sealed this 28th day of October 1969.

(SEAL)
Attest:

Edward M. Fletcher, Jr.
Attesting Officer

WILLIAM E. SCHUYLER, JR.
Commissioner of Patents